US011393062B2

(12) United States Patent
Jacob Da Silva et al.

(10) Patent No.: US 11,393,062 B2
(45) Date of Patent: Jul. 19, 2022

(54) AUTOMATIC SECURITY CHECK FOR MISSING PASSENGER ON RIDE SERVICES

(71) Applicant: LENOVO Enterprise Solutions (Singapore) PTE. LTD., New Tech Park (SG)

(72) Inventors: Roberto Jacob Da Silva, Oak Park, CA (US); Radu M. Iorga, Bucharest (RO); Corneliu-Ilie Calciu, Bucharest (RO)

(73) Assignee: LENOVO Enterprise Solutions (Singapore) PTE. LTD., New Tech Park (SG)

(*) Notice: Subject to any disclaimer, the term of this patent is extended or adjusted under 35 U.S.C. 154(b) by 284 days.

(21) Appl. No.: 16/917,275

(22) Filed: Jun. 30, 2020

(65) Prior Publication Data

US 2021/0407028 A1 Dec. 30, 2021

(51) Int. Cl.

| | |
|---|---|
| *H04W 4/021* | (2018.01) |
| *G06Q 50/26* | (2012.01) |
| *G06Q 50/30* | (2012.01) |
| *G06F 1/28* | (2006.01) |
| *G08B 25/01* | (2006.01) |
| *H04W 4/20* | (2018.01) |
| *H04W 4/029* | (2018.01) |
| *G06N 20/00* | (2019.01) |

(52) U.S. Cl.
CPC ............. *G06Q 50/265* (2013.01); *G06F 1/28* (2013.01); *G06N 20/00* (2019.01); *G06Q 50/30* (2013.01); *G08B 25/016* (2013.01); *H04W 4/021* (2013.01); *H04W 4/029* (2018.02); *H04W 4/20* (2013.01)

(58) Field of Classification Search
CPC ....... H04W 4/029; H04W 4/021; H04W 4/20; G06Q 50/30
See application file for complete search history.

(56) References Cited

U.S. PATENT DOCUMENTS

| | | | | |
|---|---|---|---|---|
| 11,062,416 B1* | 7/2021 | Jang | ..................... | G06Q 30/016 |
| 2016/0140835 A1* | 5/2016 | Smith | .................. | G08B 25/006 |
| | | | | 340/539.13 |
| 2017/0251347 A1* | 8/2017 | Mehta | ..................... | H04W 4/90 |
| 2020/0234391 A1* | 7/2020 | Shu | ........................ | G08G 1/202 |

* cited by examiner

*Primary Examiner* — Barry W Taylor
(74) *Attorney, Agent, or Firm* — Kunzler Bean & Adamson; Bruce R. Needham

(57) ABSTRACT

An apparatus includes a processor and a memory that stores code executable by the processor to transmit a passenger status message in response to a trigger event indicative of a passenger failing to be picked up at a pickup location by a ride service vehicle. The passenger status message is transmitted to a passenger mobile communication device and a driver. The code is executable to transmit a help message to members of a passenger trusted list in response to receiving a reply to the passenger status message from the passenger indicative of a request for help by the passenger. The code is executable to transmit to a police agency a police request to assist the passenger in response to a trusted list timeout, which is indicative of not receiving a message from a member of the passenger trusted list that indicates the passenger is okay before the trusted list timeout.

20 Claims, 8 Drawing Sheets

AUTOMATIC SECURITY CHECK FOR MISSING PASSENGER ON RIDE SERVICES

FIELD

The subject matter disclosed herein relates to ride services and more particularly relates to an automatic security check for a missing passenger of a ride service.

BACKGROUND

All too often, passengers of ride services, such as ride-sharing services, taxi services, limousine services, etc. encounter problems walking to a designated pickup location such as being assaulted, kidnapped, robbed etc. In other circumstances, drivers for the ride services cause harm to the passengers.

BRIEF SUMMARY

An apparatus for an automatic security check for a missing passenger of a ride service is disclosed. A method and computer program product also perform the functions of the apparatus. The apparatus includes a processor and a memory that stores program code executable by the processor to transmit a passenger status message in response to a trigger event indicative of a passenger failing to be picked up at a designated pickup location by a vehicle of a ride service. The passenger status message is transmitted to a mobile communication device of the passenger and to a driver of the vehicle. The program code is executable by the processor to transmit a help message to at least one member of a passenger trusted list in response to receiving a reply to the passenger status message from the passenger indicative of a request for help by the passenger. The program code is executable by the processor to transmit to a local police agency a police request to assist the passenger in response to a trusted list timeout. The trusted list timeout is indicative of not receiving a message from a member of the passenger trusted list that indicates the passenger does not need assistance within a trusted list timeout period.

A method for an automatic security check for a missing passenger of a ride service includes transmitting, by use of a processor, a passenger status message in response to a trigger event indicative of a passenger failing to be picked up at a designated pickup location by a vehicle of a ride service. The passenger status message is transmitted to a mobile communication device of the passenger and to a driver of the vehicle. The method includes transmitting, by use of a processor, a help message to at least one member of a passenger trusted list in response to receiving a reply to the passenger status message from the passenger indicative of a request for help by the passenger and transmitting, by use of a processor, to a local police agency a police request to assist the passenger in response to a trusted list timeout. The trusted list timeout is indicative of not receiving a message from a member of the passenger trusted list that indicates the passenger does not need assistance within a trusted list timeout period.

A program product for an automatic security check for a missing passenger of a ride service includes a computer readable storage medium and program code. The program code is configured to be executable by a processor to perform operations that include transmitting a passenger status message in response to a trigger event indicative of a passenger failing to be picked up at a designated pickup location by a vehicle of a ride service. The passenger status message is transmitted to a mobile communication device of the passenger and to a driver of the vehicle. The program code is configured to be executable by a processor to perform operations that include transmitting a help message to at least one member of a passenger trusted list in response to receiving a reply to the passenger status message from the passenger indicative of a request for help by the passenger and transmitting to a local police agency a police request to assist the passenger in response to a trusted list timeout, the trusted list timeout indicative of not receiving a message from a member of the passenger trusted list that indicates the passenger does not need assistance within a trusted list timeout period.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
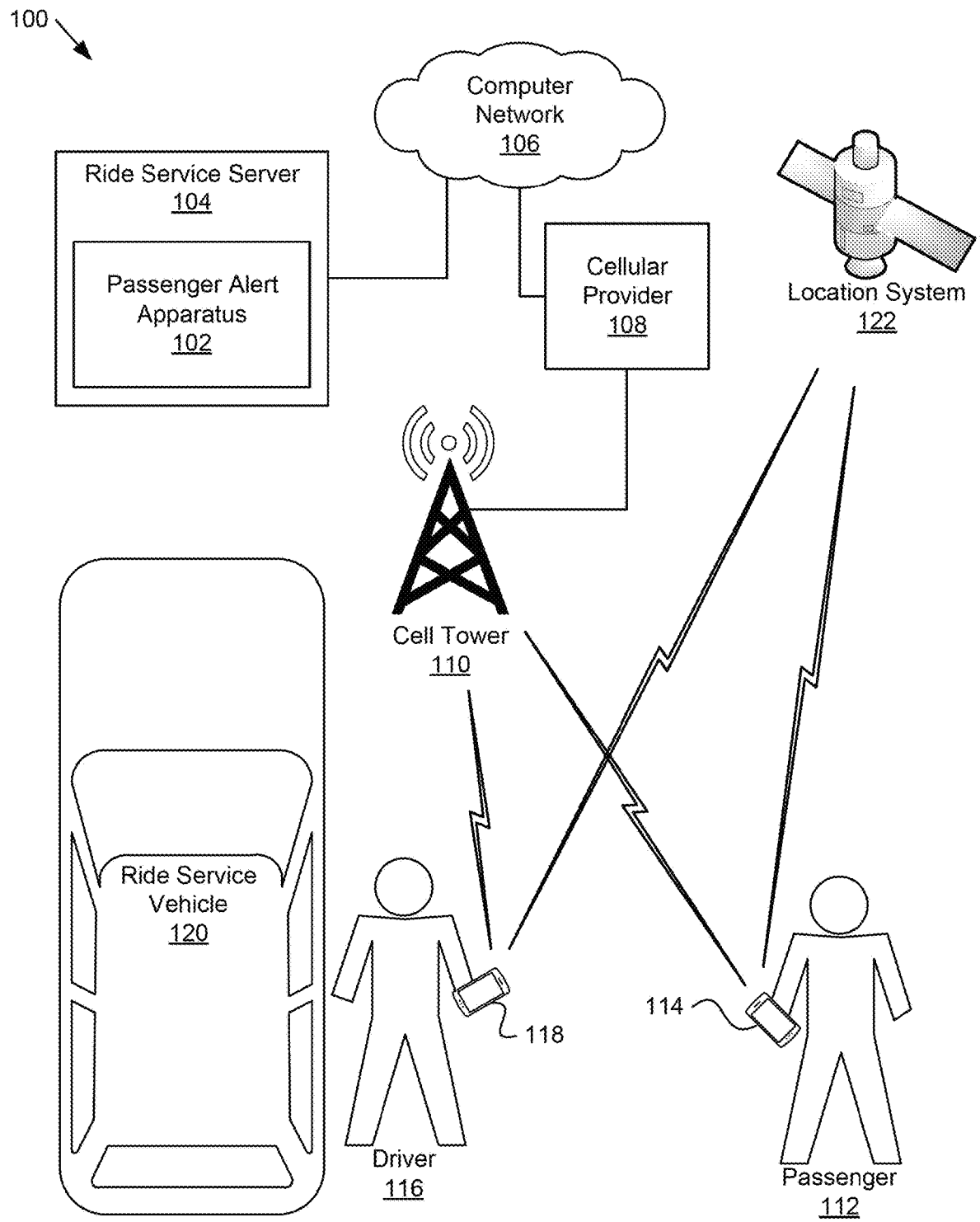
FIG. 1 is a schematic block diagram illustrating one embodiment of a system for an automatic security check for a missing passenger of a ride service.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for an automatic security check for a missing passenger of a ride service is disclosed. A method and computer program product also perform the functions of the apparatus. The apparatus includes a processor and a memory that stores program code executable by the processor to transmit a passenger status message in response to a trigger event indicative of a passenger failing to be picked up at a designated pickup location by a vehicle of a ride service. The passenger status message is transmitted to a mobile communication device of the passenger and to a driver of the vehicle. The program code is executable by the processor to transmit a help message to at least one member of a passenger trusted list in response to receiving a reply to the passenger status message from the passenger indicative of a request for help by the passenger. The program code is executable by the processor to transmit to a local police agency a police request to assist the passenger in response to a trusted list timeout. The trusted list timeout is indicative of not receiving a message from a member of the passenger trusted list that indicates the passenger does not need assistance within a trusted list timeout period.

In some embodiments, the program code is further executable by the processor to transmit the help message to the at least one member of the passenger trusted list in response to a passenger timeout and maintaining contact with the mobile communication device of the passenger. The passenger timeout is indicative of not receiving a response to the passenger status message from the passenger within a passenger timeout period. In a further embodiment, the passenger timeout is shorter for a first passenger deemed more at risk than a second passenger. In other embodiments, the program code is further executable by the processor to transmit the help message to the at least one member of the passenger trusted list in response to losing contact with the mobile communication device of the passenger and a battery charge status of the mobile communication device of the passenger being at or above a battery threshold prior to the loss of contact with the mobile communication device of the passenger.

In some embodiments, the program code is further executable by the processor to transmit the help message to the at least one member of the passenger trusted list in response to losing contact with the mobile communication device of the passenger, a battery charge status of the mobile communication device of the passenger being below a battery threshold prior to the loss of contact with the mobile communication device of the passenger and in response to receiving a passenger missing message from the driver in response to the passenger status message. In other embodiments, the program code is further executable by the processor to prevent sending of the help message to the at least one member of the passenger trusted list in response to receiving a message from the passenger indicating that the passenger does not require assistance, receiving a message from the passenger indicating that the passenger has cancelled a request for a ride from the ride service and/or losing contact with the mobile communication device of the passenger, a battery charge status of the mobile communication device of the passenger being below a battery threshold prior to the loss of contact with the mobile communication device of the passenger and in response to receiving a passenger okay message from the driver in response to the passenger status message.

In some embodiments, the trigger event includes the vehicle arriving at the designated pickup location and, after expiration of a pickup time limit, a location of the mobile communication device of the passenger being different than the designated pickup location by a threshold pickup distance. In other embodiments, the trigger event includes, while the vehicle is traveling toward the designated pickup location, a location of the mobile communication device is moving away from the designated pickup location. In other embodiments, the trigger event includes, while the vehicle is traveling toward the designated pickup location, losing contact with the mobile communication device of the passenger and a battery charge status of the mobile communication device of the passenger being at or above a battery threshold prior to the loss of contact with the mobile communication device of the passenger.

In various embodiments, the help message and/or the police request include a last known location of the mobile communication device of the passenger, the designated pickup location, a scheduled pickup time, identification information regarding the passenger, contact information of the passenger, identification information regarding the driver, contact information of the driver, the passenger trusted list and associated contact information, identifying information of the vehicle of the ride service and/or contact information of the ride service. In other embodiments, he trusted list timeout and/or a timeout associated with the trigger event is shorter for a first passenger deemed more at risk than a second passenger.

In some embodiments, the program code is further executable by the processor to monitor passenger help information. The passenger help information includes trigger events, timeouts associated with trigger events, timing associated with receiving a reply from the passenger to the passenger status message, vehicle arrival timing with respect to a scheduled pickup time, timing of receipt of a message from members of the passenger trusted list with respect to transmission of the help message and/or police response time regarding the police request. In the embodiments, the program code is further executable by the processor to adaptively change parameters associated with the apparatus in response to machine learning based on the passenger help information.

A method for an automatic security check for a missing passenger of a ride service includes transmitting, by use of a processor, a passenger status message in response to a trigger event indicative of a passenger failing to be picked up at a designated pickup location by a vehicle of a ride service. The passenger status message is transmitted to a mobile communication device of the passenger and to a driver of the vehicle. The method includes transmitting, by use of a processor, a help message to at least one member of a passenger trusted list in response to receiving a reply to the passenger status message from the passenger indicative of a request for help by the passenger and transmitting, by use of a processor, to a local police agency a police request to assist the passenger in response to a trusted list timeout. The trusted list timeout is indicative of not receiving a message from a member of the passenger trusted list that indicates the passenger does not need assistance within a trusted list timeout period.

In some embodiments, the method includes transmitting the help message to the at least one member of the passenger trusted list in response to a passenger timeout and maintaining contact with the mobile communication device of the passenger. The passenger timeout is indicative of not receiving a response to the passenger status message from the passenger within a passenger timeout period.

In some embodiments, the method includes transmitting, by use of a processor, the help message to the at least one member of the passenger trusted list in response to losing contact with the mobile communication device of the passenger and a battery charge status of the mobile communication device of the passenger being at or above a battery threshold prior to the loss of contact with the mobile communication device of the passenger. In other embodiments, the method includes transmitting, by use of a processor, the help message to the at least one member of the passenger trusted list in response to losing contact with the mobile communication device of the passenger, a battery charge status of the mobile communication device of the passenger being below a battery threshold prior to the loss of contact with the mobile communication device of the passenger and in response to receiving a passenger missing message from the driver in response to the passenger status message.

In some embodiments, the method includes preventing sending of the help message to the at least one member of the passenger trusted list in response to receiving a message from the passenger indicating that the passenger does not require assistance, receiving a message from the passenger indicating that the passenger has cancelled a request for a ride from the ride service and/or losing contact with the mobile communication device of the passenger, a battery charge status of the mobile communication device of the passenger being below a battery threshold prior to the loss of contact with the mobile communication device of the passenger and in response to receiving a passenger okay message from the driver in response to the passenger status message.

In some embodiments, the trigger event includes the vehicle arriving at the designated pickup location and, after expiration of a pickup time limit, a location of the mobile communication device of the passenger being different than the designated pickup location by a threshold pickup distance. In other embodiments, the trigger event includes, while the vehicle is traveling toward the designated pickup location, a location of the mobile communication device is moving away from the designated pickup location. In other embodiments, the trigger event includes, while the vehicle is traveling toward the designated pickup location, losing contact with the mobile communication device of the passenger and a battery charge status of the mobile communication device of the passenger being at or above a battery threshold prior to the loss of contact with the mobile communication device of the passenger.

In some embodiments, the method includes monitoring passenger help information. The passenger help information includes trigger events, timeouts associated with trigger events, timing associated with receiving a reply from the passenger to the passenger status message, vehicle arrival timing with respect to a scheduled pickup time, timing of receipt of a message from members of the passenger trusted list with respect to transmission of the help message and/or police response time regarding the police request. In the embodiment, the method includes adaptively changing parameters associated with the method in response to machine learning based on the passenger help information.

A program product for an automatic security check for a missing passenger of a ride service includes a computer readable storage medium and program code. The program code is configured to be executable by a processor to perform operations that include transmitting a passenger status message in response to a trigger event indicative of a passenger failing to be picked up at a designated pickup location by a vehicle of a ride service. The passenger status message is transmitted to a mobile communication device of the passenger and to a driver of the vehicle. The program code is configured to be executable by a processor to perform operations that include transmitting a help message to at least one member of a passenger trusted list in response to receiving a reply to the passenger status message from the passenger indicative of a request for help by the passenger and transmitting to a local police agency a police request to assist the passenger in response to a trusted list timeout, the trusted list timeout indicative of not receiving a message from a member of the passenger trusted list that indicates the passenger does not need assistance within a trusted list timeout period.

In some embodiments, the program product includes program code to perform operations that include transmitting the help message to the at least one member of the passenger trusted list in response to a passenger timeout and maintaining contact with the mobile communication device of the passenger, the passenger timeout indicative of not receiving a response to the passenger status message from the passenger within a passenger timeout period. In other embodiments, the program product includes program code to perform operations that include transmitting the help message to the at least one member of the passenger trusted list in response to losing contact with the mobile communication device of the passenger and a battery charge status of the mobile communication device of the passenger being at or above a battery threshold prior to the loss of contact with the mobile communication device of the passenger.

In other embodiments, the program product includes program code to perform operations that include transmitting the help message to the at least one member of the passenger trusted list in response to losing contact with the mobile communication device of the passenger, a battery charge status of the mobile communication device of the passenger being below a battery threshold prior to the loss of contact with the mobile communication device of the passenger and in response to receiving a passenger missing message from the driver in response to the passenger status message.

In some embodiments, the trigger event includes the vehicle arriving at the designated pickup location and, after expiration of a pickup time limit, a location of the mobile communication device of the passenger being different than the designated pickup location by a threshold pickup distance. In other embodiments, the trigger event includes while the vehicle is traveling toward the designated pickup location, a location of the mobile communication device is moving away from the designated pickup location. In other embodiments, the trigger event includes while the vehicle is traveling toward the designated pickup location, losing contact with the mobile communication device of the passenger and a battery charge status of the mobile communication device of the passenger being at or above a battery threshold prior to the loss of contact with the mobile communication device of the passenger.

FIG. 1 is a schematic block diagram illustrating one embodiment of a system 100 for an automatic security check for a missing passenger of a ride service. The system 100 includes a passenger alert apparatus 102 in a ride service server 104, a computer network 106, a cellular provider 108, a cell tower 110, a passenger 112, a mobile communication device 114 of the passenger 112, a driver 116, a communication device 118 of the driver 116, a ride service vehicle 120 and a location system 122, which are described below.

The system 100 includes a passenger alert apparatus 102 in a ride service server 104 of a ride service. In some embodiments, the ride service is a ride-sharing service which allows a passenger 112 to call for a ride and the ride-sharing service matches a driver 116 with the passenger 112 where the driver 116 picks up the passenger 112 at a designated pickup location and transports the passenger 112 typically for a fee. For example, the ride-sharing service may be a service like Uber®, Lyft™, Via™, Gett®, or the like. In other embodiments, the ride service is a ride hailing and/or taxi service that allows a passenger 112 to hail a ride-hailing or taxi from the street in addition to arranging for a ride by contacting the ride-hailing or taxi service. The ride service is any transportation service that provides transportation to a passenger 112 by picking up the passenger 112 at a designated pickup location.

There are particular dangers associated with a ride service that picks up passengers 112. For example, a passenger 112 may believe that a vehicle is from the ride service and may get in the vehicle and then may be assaulted, kidnapped, robbed or worse. In addition, the passenger 112 may be waiting for a ride service vehicle 120 at night, in a dangerous location, etc. and may be attacked, robbed, etc. the passenger alert apparatus 102 provides a way to help protect passengers 112 by automatically determining if the passenger 112 needs help and then under certain circumstances sends help messages to members of a trusted list and/or to police. The passenger alert apparatus 102 is described in more detail below with regard to the apparatuses 200, 300 of FIGS. 2 and 3.

In some embodiments, the passenger alert apparatus 102 is implemented in a server 104 or other computing equipment of the ride service. Parts of the passenger alert apparatus 102 may also be incorporated in the ride service vehicle 120, a communication device 118 of the driver 116, in a mobile communication device 114 of the passenger 112, etc. For example, the passenger 112 may be running an application on the mobile communication device 114 of the passenger 112 that is part of or in communication with the passenger alert apparatus 102. In other embodiments, the driver 116 may also be running an application on the communication device 118 of the driver 116, which may be mobile, such as a smartphone and/or may be installed in the ride service vehicle 120.

The ride service server 104, in some embodiments, is a mainframe computer, a workstation, a desktop computer, a rack-mounted server, a virtual machine in a cloud service or any other implementation known to those of skill in the art. The ride service server 104, in some embodiments, is connected to a computer network 106, which connects directly to the communication device 118 of the driver 116 and/or ride service vehicle 120 and/or to the mobile communication device 114 of the passenger 112. The computer network 106 may include a local area network ("LAN"), a wide area network ("WAN"), a fiber channel network, a wireless network with a wireless connection, the Internet, etc. and any combination thereof. The computer network 106 includes routers, switches, servers, cables, etc.

In some embodiments, the ride service server 104 communicates wirelessly over a wireless connection with the communication device 118 of the driver 116 and/or ride service vehicle 120 and/or to the mobile communication device 114 of the passenger 112. In some embodiments, the ride service server 104 communicates wirelessly over a wireless connection with the communication device 118 of the driver 116 and/or ride service vehicle 120 and/or to the mobile communication device 114 of the passenger 112 through a cellular provider 108 and cell tower 110.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

The passenger 112 is any person that is seeking a ride from the ride service and has a mobile communication device 114. To take advantage of the benefits of the passenger alert apparatus 102, the passenger 112 has arranged with the ride share service or driver 116 to be picked up at a designated pickup location and the passenger alert apparatus 102 has access for communication with and/or location of the mobile communication device 114 of the passenger 112. In some embodiments, more than one passenger 112 are together seeking a ride from the ride service. The passenger 112 typically pays for transportation using the ride share service, but the passenger alert apparatus 102 may also provide transportation without a fee. For example, the ride service may be a charitable organization, a church providing rides for parishioners or others, etc.

The mobile communication device 114 of the passenger 112 includes an ability to communicate with the driver 116 and/or ride service by voice, text, email, etc. For example, the mobile communication device 114 may be smartphone, a personal digital assistant ("PDA"), a tablet computer, a laptop computer, and the like. Typically, the mobile communication device 114 includes access to a location system 122 which provides a location of the mobile communication device 114 to the passenger 112 and/or to the passenger alert apparatus 102. For example, the location system 122 may be a global positioning system ("GPS") and the mobile communication device 114 accesses one or more GPS satellites to determine a position of the mobile communication device 114. In other embodiments, the location system 122 includes other wireless methods for determining the location of the mobile communication device 114, such as through triangulation using cell towers 110, wireless signal strength on particular networks, etc.

The driver 116 drives the ride service vehicle 120 to provide transportation of the passenger 112 from the designated pickup location to a destination using the ride service vehicle 120 and the driver 120 has access to a communication device 118, which may be a mobile communication device, such as a smartphone, PDA, etc. or may be a communication system installed in the ride service vehicle 120. Typically, the communication device 118 and/or ride service vehicle 120 include access to a location system 122 to provide a location to the passenger alert apparatus 102 along with an ability to communicate messages to the ride service, the passenger 112 and/or the passenger alert apparatus 102. The driver 116 may be a professional driver, an independent contractor offering the driver's personal vehicle as the ride service vehicle 120, a volunteer or worker for a charitable organization, a youth group, a church, etc., a friend of the passenger 112, or the like.

The ride service vehicle 120 is any vehicle capable of transporting one or more passengers 112. The ride service vehicle 120 may be an automobile, a truck, a limousine, a van, a bus, a rickshaw, a motorcycle, etc. Typically, the ride service vehicle 120 is tracked by the ride service. In other embodiments, the ride service tracks the communication device 118. One of skill in the art will recognize other ride service vehicles 120 and ways to track the driver 116 and/or the ride service vehicle 120.

Figure 2:
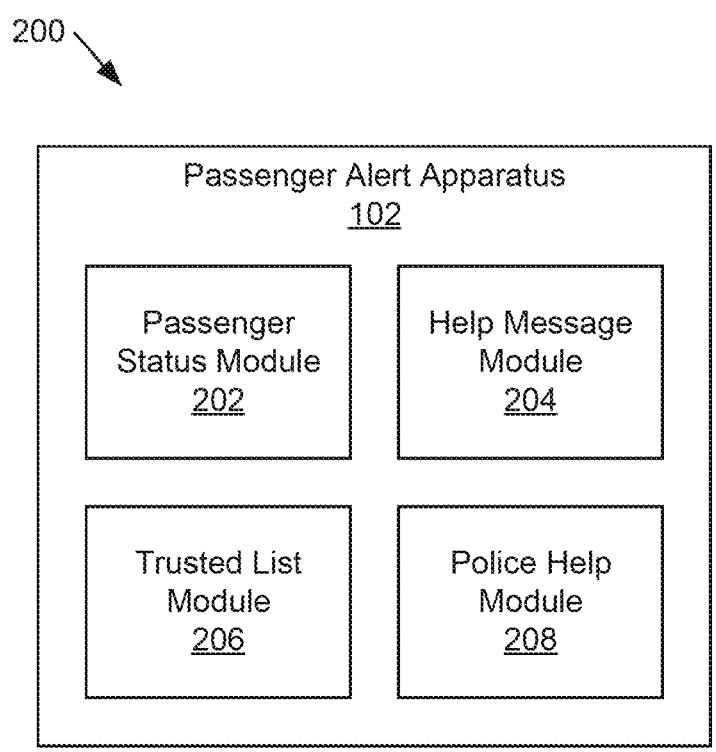
FIG. 2 is a schematic block diagram illustrating one embodiment of an apparatus for an automatic security check for a missing passenger of a ride service.

FIG. 2 is a schematic block diagram illustrating one embodiment of an apparatus 200 for an automatic security check for a missing passenger of a ride service. The apparatus 200 includes one embodiment of a passenger alert apparatus 102 with a passenger status module 202, a help message module 204, a trusted list module 206 and a police help module 208, which are described below. The apparatus 200, in some embodiments, is implemented as program code executable on a processor and stored on computer readable storage media. The programmable code, in some embodiments, is implemented with a portion on the ride service server 104 while other portions, such as an application with program code, is implemented on the mobile communication device 114 and/or the communication device 118 of the driver 116/ride service vehicle 120. In other embodiments, a portion or all of the apparatus 200 is implemented using a programmable hardware device or other methods.

The apparatus 200 includes a passenger status module 202 that transmits a passenger status message in response to a trigger event indicative of a passenger 112 failing to be picked up at a designated pickup location by a vehicle 120 of a ride service. The passenger status message is transmitted to a mobile communication device 114 of the passenger 112 and to a driver 116 of the vehicle 120. The trigger event is an event that may include the passenger 112 not being at the designated pickup location, the passenger 112 moving away from the designated pickup location at or near the time of pickup or other indicator that the passenger 112 may be in a dangerous situation or may need assistance.

The passenger status message is sent in a form that alerts the passenger 112 and driver 116 quickly. For example, the passenger status module 202 may send the passenger status message as a text message to a phone number of the passenger 112 and/or driver 116. In other embodiments, the passenger status module 202 transmits the passenger status message by sending an alert through a direct messaging application on the mobile communication device 114 of the passenger 112 and/or communication device 118 of the driver 116/ride service vehicle 120 that will play a sound, vibrate the device 114, 118, flash a screen, etc. to get the attention of the passenger 112 and/or driver 116. In another embodiment, the passenger status module 202 transmits the passenger status message by another direct message service. In another embodiment, the passenger status message is a phone call. One of skill in the art will recognize other ways for the passenger status module 202 to transmit the passenger status message in a way to alert the passenger 112 and driver 116.

The passenger status message, in some embodiments, is a message sent to the passenger 112 and to the driver 116 seeking status of the passenger 112. For example, the passenger status message sent to the passenger 112 may ask the passenger 112 to respond by indicating whether or not the passenger 112 needs assistance. The passenger status message to the passenger 112 may include, in some embodiments, a way for the passenger 112 to reply with a single touch. For example, the passenger status message may appear on an application where the passenger 112 is able to touch a portion of a screen, a button, a key, etc. that indicates that the passenger 112 requires assistance. The message may read: "You are late to be picked up at the designated pickup location by Ride Service. Please let us know your status," or something similar and the passenger status message may be accompanied by a box on a screen that reads "I need help" and another that reads "I am OK," or similar responses. In other embodiments, other replies may be displayed, such as "Just running a little late," "I want to cancel the ride," "I will be there soon," "I am being attacked," "send help ASAP," "I am having a medical emergency," or the like.

Once the passenger 112 has touched a box on the screen, pushed an appropriate button, etc. a reply is sent to the passenger alert apparatus 102 that matches the reply chosen by the passenger 112 or that conveys the sentiment of the reply selected by the passenger 112. In other embodiments, the passenger status module 202 displays a phone number or a button, box, etc. for the passenger 112 to call the phone number. In other embodiments, the passenger status module 202 displays a text box for the passenger 112 to enter text to be sent as a reply or as additional information to a selected reply. In other embodiments, the passenger status module 202 allows the passenger 112 to send an email or other communication using a communication protocol outside the passenger alert apparatus 102. The passenger status module 202 may interpret text input by the passenger 112 to determine if the passenger 112 needs assistance.

The passenger status message sent by the passenger status module 202 to the driver 116 includes a message inquiring about the status of the passenger 112. For example, the passenger status message may ask the driver 116 if the driver 116 can see the passenger 112, if the passenger 112 has cancelled the ride verbally, is at the designated pickup location, etc. The passenger status module 202 may include one or more replies for the driver 116 to respond in the form of boxes, lines with corresponding buttons, etc. that may be selected by the driver 116. The passenger status message may include a message such as "Please provide a known status of the passenger" along with replies such as "passenger status unknown," "passenger has arrived," "passenger in vehicle," "passenger needs help," or the like.

Typically, the response of the passenger 112 has priority over a response from the driver 116 and responses from the passenger 112 are assumed to be trusted. For example, the driver 116 may be endangering the passenger 112 so that responses from the passenger 112 take precedence over responses from the driver 116 and the response of the driver 116 is used in limited circumstances, as described below.

The apparatus 200 includes a help message module 204 that transmits a help message to at least one member of a passenger trusted list in response to receiving a reply to the passenger status message from the passenger 112 indicative of a request for help by the passenger 112. The apparatus 200, in some embodiments, includes a trusted list module 206 that updates and maintains a passenger trusted list of the passenger 112. The passenger trusted list of the passenger 112, in some embodiments, is a list of one or more contacts of people or entities that the passenger 112 wants contacted in an emergency situation. Where the trusted contact is an entity, the entity may be a monitoring service that the passenger 112 has enlisted to receive help messages and other messages and then to act appropriately based on the message. For example, the entity may be a non-police service that monitors burglar alarms or other emergency situations.

In one embodiment, the passenger 112 uses the trusted list module 206 to create the passenger trusted list, for example, during setup of an application implementing the passenger alert apparatus 102. In other embodiments, the trusted list module 206 uses information from the passenger 112 to create the passenger trusted list from a form, document, etc. created by the passenger 112. For example, the passenger 112 may fill out a registration form that includes alternate contacts and the trusted list module 206 then uses the alternate contact information to create the passenger trusted list. The passenger trusted list, in some embodiments, includes a way of contacting each person in the passenger trusted list in a way that the help message is viewed quickly by the person in the passenger trusted list. The help message may be sent to a person and/or entity in the passenger trusted list in a way similar to the passenger status message transmitted by the passenger status module 202.

The help message module 204 transmits the help message, in some embodiments, once the passenger status module 202 receives a response to the passenger status message from the passenger 112 indicative of a request for help from the passenger 112. For example, the passenger 112 may reply to a passenger status message with a message like "I need help." In some embodiments, choices for the passenger 112 in the passenger status message may include two or more replies that indicate that the passenger 112 needs help and the help message module 204 responds any of these two or more replies indicating that the passenger 112 needs help by transmitting the help message to one or more contacts on the passenger trusted list of the passenger 112.

In some embodiments, the help message module 204 transmits the help message to all contacts in the passenger trusted list. In other embodiments, the help message module 204 transmits the help message to a highest priority contact and monitors for a response from a contact in the passenger trusted list based on priority and then transmits the help message to a next highest priority contact under various conditions, such as a transmission failure of the help message to a higher priority contact, expiration of a response time limit, etc. In other embodiments, the passenger 112 may establish a multi-tier response list that may have one or more contacts of the passenger trusted list on each tier. One of skill in the art will recognize other ways that the passenger 112 may use the trusted list module 206 to establish a passenger trusted list.

The help message may take a variety of forms. The help message conveys a message to members of the passenger trusted list that the passenger 112 needs help and for the member of the passenger trusted list to respond to the help message. In some embodiments, the member of the passenger trusted list attempts to contact the passenger 112 to determine a status of the passenger 112. In other embodiments, a member of the trusted list may be with the passenger 112 and may have immediate knowledge of the passenger's condition. In other embodiments, the member of the passenger trusted list may have special knowledge of the status of the customer. For example, the member of the passenger trusted list may know that the passenger 112 has pressed a button that indicates that the passenger 112 needs help while the member of the passenger trusted list may know that the button requesting help was pressed erroneously by the passenger 112.

In some embodiments, the help message conveys to the member of the passenger trusted list a serious nature of the response of the passenger 112 needing help. In other embodiments, the help message requests a reply as to the status of the passenger 112 as soon as possible. In some embodiments, the help message conveys a sense of urgency to reply to the help message. In some embodiments, the help message include one or more buttons on a touchscreen, options corresponding to keys, etc. for a member of the passenger trusted list to select based on the knowledge of the member of the passenger trusted list of the passenger's situation. In some embodiments, the help message includes information about the passenger 112, such as the designated pickup position, a pickup time of the passenger 112, a location or last known location of the passenger 112, a name of the ride service, and/or other information that helps the member of the passenger trusted list understand the situation of the passenger 112.

The apparatus 200 includes a police help module 208 that transmits to a local police agency a police request to assist the passenger 112 in response to a trusted list timeout. The police request, in some embodiments, summons the police or other first responder to help the passenger 112. In some embodiments, the police request includes information about the passenger 112, such as a picture of the passenger 112, a description of the passenger 112, a location or last known location of the passenger 112, a response from the passenger 112 to the passenger status message and/or other information that helps the police agency understand the passenger's situation and urgency of the police request.

The local police agency may be a police department, highway patrol, sheriff's department, etc. that has jurisdiction where the passenger 112 is located, at the designated pickup location, etc. In some embodiments, the police help module 208 sends the police request to a help line, such as a 911 service. In other embodiments, the police help module 208 also sends a message to a fire department or other first responder based on a known condition of the passenger 112. For example, if the passenger 112 responds to the passenger status message with "I am having a medical emergency," the police help module 208 may send the police request to a local fire department or other first responder agency. In other embodiments, the police help module 208 transmits the police request to a first responder agency, to a 911 service, etc. without sending the police request to the local police agency. In the embodiments described herein, the local police agency also includes any appropriate local first responder agency and the police request includes any request to help the passenger 112 to a local first responder agency.

In some embodiments, the help message to one or more members of the passenger trusted list and/or the police request include information such as a last known location of the mobile communication device 114 of the passenger 112, the designated pickup location, a scheduled pickup time, identification information regarding the passenger 112, contact information of the passenger 112, identification information regarding the driver 116, contact information of the driver 116, the passenger trusted list and associated contact information, identifying information of the ride service vehicle 120 and/or contact information of the ride service. One of skill in the art will recognize other information to be included with the help message and/or police request.

The trusted list timeout is indicative of not receiving a message from a member of the passenger trusted list that indicates the passenger does not need assistance within a trusted list timeout period. For example, the trusted list timeout may include expiration of a trusted list timer or may include a counter that reaches the trusted list timeout. The timer or counter, in some embodiments, is stopped before the trusted list timeout in response to a member of the passenger trusted list responding to the help message with a response that indicates that the passenger 112 does not need assistance. Where the trusted list timeout does not expire, a trusted list timer or counter is stopped, etc. due to receipt of a message from a member of the passenger trusted list that the passenger 112 does not need help, the police help module 208 does not send the police request. In other embodiments, the trusted list timeout is triggered by a response to the help message from a member of the passenger trusted list responding that the passenger 112 needs help. In other embodiments, where no response to the help message is received from a member of the passenger trusted list prior to the trusted list timeout, the police help module 202 transmits the police request.

Figure 3:
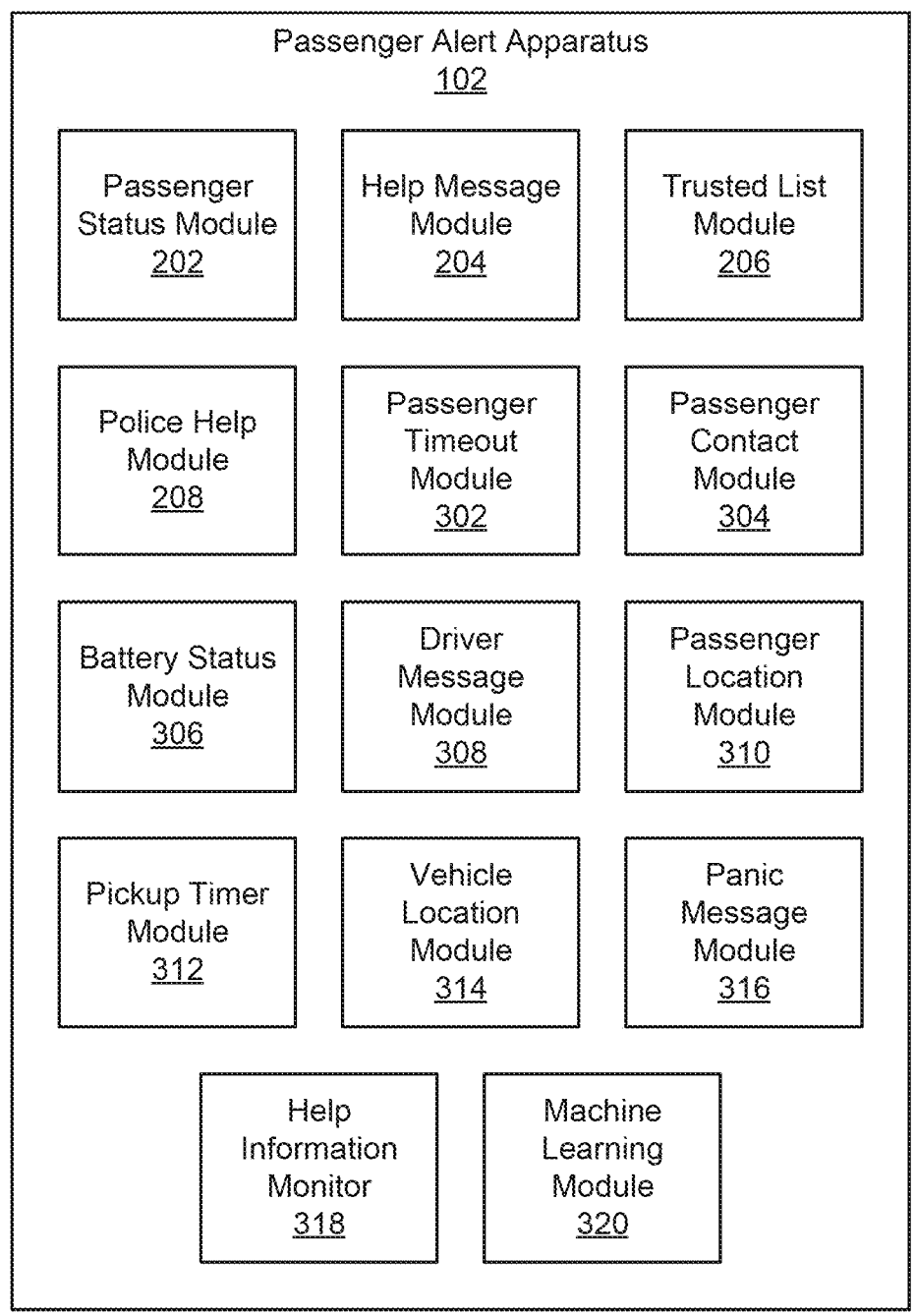
FIG. 3 is a schematic block diagram illustrating another embodiment of an apparatus for an automatic security check for a missing passenger of a ride service.

FIG. 3 is a schematic block diagram illustrating another embodiment of an apparatus 300 for an automatic security check for a missing passenger of a ride service. The apparatus 300 includes another embodiment of the passenger alert apparatus 102 that includes a passenger status module 202, a help message module 204, a trusted list module 206 and a police help module 208, which are substantially similar to those described above with respect to the apparatus 200 of FIG. 2. In various embodiments, the apparatus 300 includes a passenger timeout module 302, a passenger contact module 304, a battery status module 306, a driver message module 308, a passenger location module 310, a pickup timer module 312, a vehicle location module 314, a panic message module 316, a help information module 318 and/or a machine learning module 320, which are described below.

The apparatus 300, in some embodiments, includes a passenger timeout module 302 and a passenger contact module 304. The passenger contact module 304 tracks contact with the mobile communication device 114 of the passenger 112 to determine if contact is lost with the mobile communication device 114 of the passenger 112. For example, the passenger contact module 304 may coordinate with the cellular provider 108 or other communication service that facilitates communication with the mobile communication device 114 to track contact with the mobile communication device 114. In other embodiments, the passenger contact module 304 periodically sends a message or signal to an application on the mobile communication device 114 seeking response and reports a loss of contact with the mobile communication device 114 if the application on the mobile communication device 114 does not respond based on a contact criteria. In some examples, the contact criteria is a time limit for response to the message/signal from the passenger contact module 304. In other embodiments, the contact criteria includes not receiving a response to two or more messages/signals from the passenger contact module 304. One of skill in the art will recognize other contact criteria.

The passenger timeout module 302 starts a passenger response timer in response to the passenger status module 202 sending a passenger status message to the passenger 112 and triggers a passenger timeout after not receiving a response from the passenger 112 before a specified amount of time. For example, if the passenger 112 does not send a response to the passenger status message within specified amount time of five minutes, the passenger timeout module 302 triggers a passenger timeout. Where the passenger contact module 304 maintains contact with the mobile communication device 114 of the passenger 112 and the passenger timeout module 302 triggers a passenger timeout, the help message module 204 sends the help message to the members of the passenger trusted list.

The passenger timeout, in some embodiments, is reasonable amount of time to wait before there is concern about the passenger 112. For example, the passenger timeout may be five minutes. In other embodiments, the passenger timeout is ten minutes. In other embodiments, the passenger timeout is based on the passenger 112. For example, a passenger that is more vulnerable, such as a juvenile, an elderly person, a disabled person, etc. may have a passenger timeout that is shorter than a more able person.

The apparatus 300, in some embodiments, includes a battery status module 306 that monitors a battery charge status of the mobile communication device 114. The battery status module 306, in some embodiments, monitors a charge status of the battery of the mobile communication device 114 to determine if the mobile communication device 114 is about to shut down to low battery charge. The battery status module 306, in some embodiments, determines if a battery charge status is above or below a battery threshold. After the passenger status module 202 sends a passenger status message to the passenger 112, where the passenger contact module 304 loses contact with the mobile communication device 114 of the passenger 112 and the battery status module 306 determines that the battery charge status of the battery of the mobile communication device 114 of the passenger 112 is at or above the battery threshold, the help message module 204 sends a help message to at least one member of the passenger trusted list.

The battery charge status above the battery threshold is indicative of the battery of the mobile communication device 114 of the passenger 112 being in a state to not have shut down due to low battery charge so loss of contact with the mobile communication device 114 of the passenger 112 after a trigger event and subsequent transmission of a passenger status message to the passenger 112 may be indicative that the passenger 112 is in need of help, which is a condition in addition to the condition described above of receiving a response from the passenger 112 indicating that the passenger 112 needs help.

The apparatus 300 includes, in some embodiments, a driver message module 308 that monitors the communication device 118 of the driver 116/ride service vehicle 120 to determine if the driver 116 has responded to a passenger status message sent by the passenger status module 202. The response from the driver 116 may be a response described above in relation to the passenger status module 202 or other messages. After a trigger event and after the passenger status module 202 sends a passenger status message to the passenger 112 and to the driver 116, where the passenger contact module 304 loses contact with the mobile communication device 114 of the passenger 112 and where the battery status module 306 determines that the battery charge status of the battery of the mobile communication device 114 of the passenger 112 is below the battery threshold, where the driver message module 308 receives a passenger missing message from the driver 116, the help message module 204 transmits a help message to at least one member of the passenger trusted list.

The passenger contact module 304 losing contact with the mobile communication device 114 of the passenger 112 at a time where the battery status module 306 determines that the battery charge status of the battery of the mobile communication device 114 of the passenger 112 is below the battery threshold may indicate that the mobile communication device 114 of the passenger 112 has shut down due to a low battery charge condition. In some embodiments, combining the low battery charge and loss of contact conditions with a response from the driver 116 that the passenger 112 is missing is enough to trigger the help message module 204 to transmit the help message.

Other conditions may be present to prevent the help message module 204 from sending of the help message to the at least one member of the passenger trusted list. In some embodiments, where the passenger alert apparatus 102 and/or passenger status module 202 receives a response from the passenger 112 that the passenger 112 does not require assistance, the help message module 204 does not send the help message. In other embodiments, where the passenger alert apparatus 102 and/or passenger status module 202 receives a communication from the passenger 112 indicating that the passenger has cancelled a request for a ride from the ride service, the help message module 204 does not send the help message. In other embodiments, any message from the passenger 112 cancelling the request for a ride from the ride service prevents the passenger alert apparatus 102 from acting to send a passenger status message, a help message or a police request.

In other embodiments, where the passenger contact module 304 loses contact with the mobile communication device 114 of the passenger 112 and where the battery status module 306 determines that the battery charge status of the battery of the mobile communication device 114 of the passenger 112 is below the battery threshold, if the driver message module 308 receives a passenger okay message from the driver 116 in response to the passenger status message, the help message module 204 does not send the help message. The passenger okay message is a message from the driver 116 indicative of the passenger 112 not requiring assistance. For example, the passenger okay message from the driver 116 may include a message that the passenger 112 is in the ride service vehicle 120, that the passenger 112 has arrived at the designated pickup location, that the driver 116 sees the passenger 112 coming toward the designated pickup location, or the like.

As stated above, the trigger event is indicative of the passenger 112 failing to be picked up at a designated pickup location by the ride service vehicle 120. In some embodiments, the apparatus 300, in some embodiments, includes a passenger location module 310, a pickup timer module 312 and a vehicle location module 314. The passenger location module 310 tracks the location of the mobile communication device 114 of the passenger 112. For example, the passenger location module 310 may use a GPS service, triangulation using cell towers 110, wireless signal strength or other location system 122 to track a location of the passenger 112.

The vehicle location module 314 tracks a location of the ride service vehicle 120. For example, the vehicle location module 314 may track a location of the communication device 118, which is with the ride service vehicle 120 and/or the driver 116. In some embodiments, the vehicle location module 314 uses a GPS service or other location system 122 to track a location of the ride service vehicle 120 and/or the driver 116.

The pickup timer module 312 starts a pickup timer when the vehicle location module 314 determines that the ride service vehicle 120 has arrived at the designated pickup location. In some embodiments, the event trigger includes the vehicle location module 314 determining that the ride service vehicle 120 as arrived at the designated pickup location and, after expiration of a pickup time limit of the pickup timer started by the pickup timer module 312, the passenger location module 310 determines that a location of the mobile communication device 114 of the passenger 112 is different than the designated pickup location by a threshold pickup distance. In one example, the threshold pickup distance is 100 meters and if the location of the mobile communication device 114 is not within 100 meters of the designated pickup location after expiration of the pickup time limit, the passenger status module 202 transmits a passenger status message.

Other embodiments include a different threshold pickup distance. In some embodiments, the threshold pickup distance is set based on surroundings of the designated pickup location. For example, a designated pickup location with view of a longer distance may have a threshold pickup distance that is longer than a designated pickup location with a lot of foliage, buildings that are close by, etc. In other embodiments, the threshold pickup distance is variable in different directions based on viewing obstacles. In other embodiments, the threshold pickup distance is based on time of day. In other embodiments, the threshold pickup distance is based on an amount of time that the passenger 112 would travel on foot to the designated pickup location.

The pickup time limit, in some embodiments, is reasonable amount of time to wait before there is concern about the passenger 112. For example, the pickup time limit may be five minutes. In other embodiments, the pickup time limit is ten minutes. In other embodiments, the pickup time limit is based on the passenger 112. For example, a passenger that is more vulnerable, such as a juvenile, an elderly person, a disabled person, etc. may have a pickup time limit that is shorter than a more able person. In other embodiments, the pickup time limit may be adjusted based on other factors, such as time of day, an amount of crime in an area around the designated pickup location, and the like. Likewise, the threshold pickup distance may also be adjusted based on the passenger 112, such as age, ability, etc. or may be adjusted based on time of day, crime in the area round the designated pickup location, etc. One of skill in the art will recognize other ways to adjust and set the pickup time limit and the threshold pickup distance.

In other embodiments, the event trigger is based on the vehicle location module 314 determining that the ride service vehicle 120 is moving toward the designated pickup location while the passenger location module 310 determines that the passenger 112 is moving away from the designated pickup location. In some embodiments, the passenger alert apparatus 102 allows for some movement of the passenger 112 away from the designated pickup location without starting a trigger event, such as travel to the designated pickup location along a route around an obstacle, following a pathway that necessarily requires temporary movement away from the designated pickup location, etc. In other embodiments, the passenger alert apparatus 102 allows for movement of the passenger 112 away from the designated pickup location without starting a trigger event for a particular amount of time. In other embodiments, the passenger alert apparatus 102 tracks movement of the passenger 112 away from the designated pickup location only during a particular window of time that the ride service vehicle 120 is near the designated pickup location or is within a particular distance from the designated pickup location. One of skill in the art will recognize other conditions that may be imposed on a trigger event where the ride service vehicle 120 is approaching the designated pickup location while the passenger 112 is moving away from the designated pickup location.

In other embodiments, a trigger event may include a situation where the vehicle location module 314 determines that the ride service vehicle 120 is traveling toward the designated pickup location, where the passenger contact module 304 loses contact with the mobile communication device 114 of the passenger 112 while the battery status module 306 determines that the battery charge status is at or above the battery threshold, which then causes the passenger status module 202 to send a passenger status message.

The passenger alert apparatus 102 may include other event triggers not mentioned above. Typically, event triggers are events where there is a cause for concern for the wellbeing of the passenger 112. One of skill in the art will recognize other event triggers.

In some embodiments, the apparatus 300 includes a panic message module 316 that triggers the police help module 208 to transmit to a local police agency a police request to assist the passenger 112 without the help message module sending the help message to one or more members of the passenger trusted list. In some examples, the passenger 112 may respond to the passenger status message with an urgent help message, such as "call the police," "I am being kidnapped," "I am being robbed," "I am being attacked," "I need an ambulance," etc. In other embodiments, the panic message module 316 triggers the police help module 208 to transmit to a local police agency a police request to assist the passenger 112 after the passenger 112 has requested a ride from the ride service but before the passenger status module 202 has sent a passenger status message. In other embodiments, the panic message module 316 triggers the police help module 208 to transmit to a local police agency a police request to assist the passenger 112 after the help message module 204 has sent a help message to one or more members of the passenger trusted list but before a member of the passenger trusted list responds. One of skill in the art will recognize other situations where the panic message module 316 triggers the police help module 208 to transmit to a local police agency a police request to assist the passenger 112.

In some embodiments, the apparatus 300 includes a help information module 318 that monitors passenger help information. The passenger help information includes information present within the passenger alert apparatus 102 that would be useful in adjusting parameters of the passenger alert apparatus 102. In some embodiments, the passenger help information includes trigger events, timeouts associated with trigger events, timing associated with receiving a reply from the passenger 112 to the passenger status message, vehicle arrival timing with respect to a scheduled pickup time, timing of receipt of a message from members of the passenger trusted list with respect to transmission of the help message and/or police response time regarding the police request. The passenger help information module 318, in other embodiments, monitors other parameters and data of the passenger alert apparatus 102.

In some embodiments, the apparatus 300 includes a machine learning module 320 that adaptively changes parameters associated with the passenger alert apparatus 102 in response to machine learning based on the passenger help information. For example, the machine learning module 320 may use machine learning to identify that a default passenger timeout is too long and may adjust the passenger timeout. For example, the machine learning module 320 may use machine learning to determine that the default passenger timeout is resulting in passenger problems that may be solved where sending the help message sooner would result in better passenger safety. In other embodiments, the machine learning module 320 may use machine learning to determine that the police help module 208 is sending too many police requests that are false alarms and that a longer trusted list timeout would result in less false alarms. The machine learning module 320 uses machine learning to analyze trends, patterns, etc. to adaptively change parameters associated with the passenger alert apparatus 102. One of skill in the art will recognize other ways that the machine learning module 320 may use machine learning to adaptively change parameters associated with the passenger alert apparatus 102.

Figure 4:
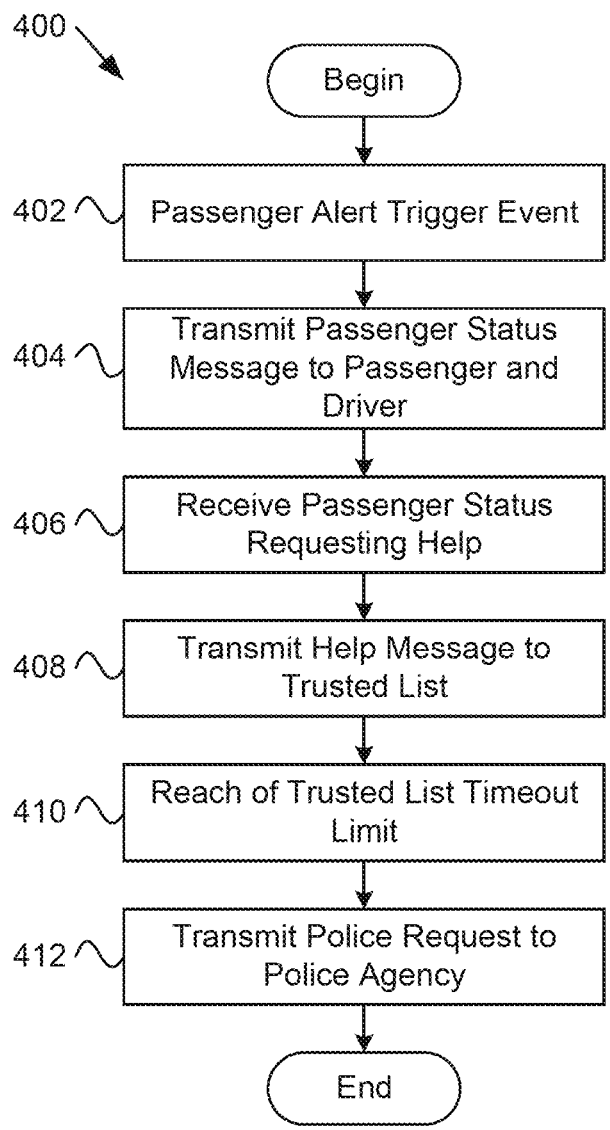
FIG. 4 is a schematic flow chart diagram illustrating one embodiment of a method for an automatic security check for a missing passenger of a ride service.

FIG. 4 is a schematic flow chart diagram illustrating one embodiment of a method 400 for an automatic security check for a missing passenger 112 on a ride service. The method 400 begins and detects 402 a passenger alert trigger event indicative of a passenger 112 failing to be picked up at a designated pickup location by a vehicle 120 of a ride service. For example, the method 400 may determine that the passenger 112 is moving away from the designated pickup location while the ride service vehicle 120 is approaching the designated pickup location, which is a trigger event. The method 400 may detect 402 a trigger event based on situations described above with regard to the apparatus 300 of FIG. 3 or other situations.

The method 400 transmits 404 a passenger status message in response to the method 400 detecting 402 the trigger event. The passenger status message is transmitted to a mobile communication device 114 of the passenger 112 and to a driver 116 of the ride service vehicle 120. The method 400 receives 406 a reply to the passenger status message from the passenger 112 indicative of a request for help by the passenger 112 and transmits 408 a help message to at least one member of a passenger trusted list in response to receiving 406 the reply to the passenger status message from the passenger 112. The method 400 reaches 410 a trusted list timeout where the trusted list timeout is indicative of not receiving a message from a member of the passenger trusted list that indicates the passenger 112 does not need assistance within a time period of the trusted list timeout. The method 400 transmits 412 to a local police agency a police request to assist the passenger 112 in response to the trusted list timeout, and the method 400 ends. In various embodiments, the method 400 is implemented using the passenger status module 202, the help message module 204, the trusted list module 206 and the police help module 208.

Figure 5:
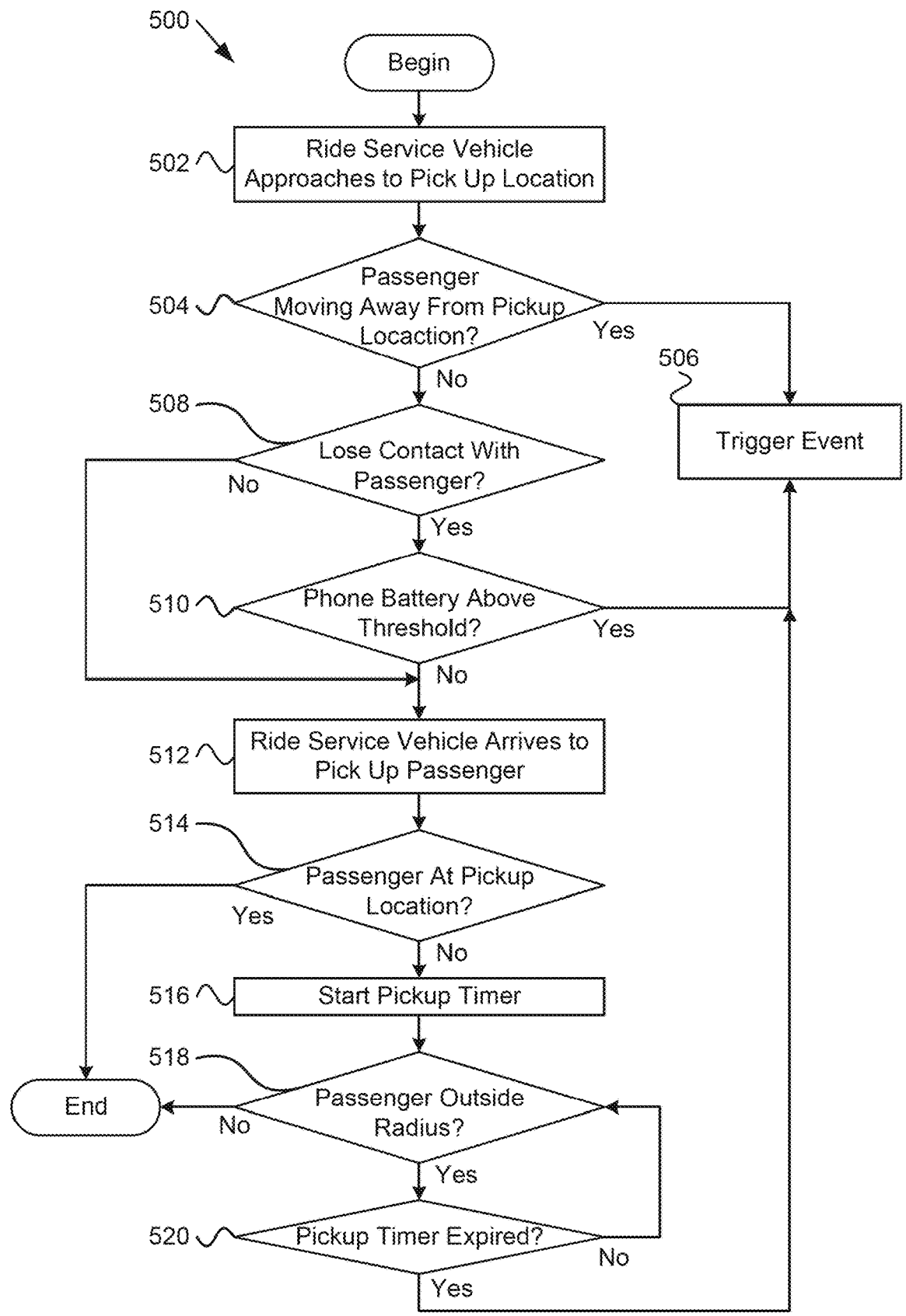
FIG. 5 is a schematic flow chart diagram illustrating one embodiment of a method for determining a trigger event for an automatic security check for a missing passenger of a ride service.

FIG. 5 is a schematic flow chart diagram illustrating one embodiment of a method 500 for determining a trigger event for an automatic security check for a missing passenger 112 on a ride service. The method 500, in some embodiments, is step 402 of the method 400 of FIG. 4. The method 500 begins and determines 502 that the ride service vehicle 120 is approaching the designated pickup location and determines 504 if the passenger 112 is moving away from the designated pickup location. If the method 500 determines 504 that the passenger 112 is moving away from the designated pickup location, the method 500 detects 506 a trigger event.

If the method 500 determines 504 that the passenger 112 is not moving away from the designated pickup location, the method 500 determines 508 if there is a loss of contact with the mobile communication device 114 of the passenger 112. If the method 500 determines 508 that there is a loss of contact with the mobile communication device 114 of the passenger 112, the method 500 determines 510 if a battery charge status of a battery of the mobile communication device 114 of the passenger 112 is above a battery threshold. If the method 500 determines 510 that the battery charge status of the battery of the mobile communication device 114 of the passenger 112 is above the battery threshold, the method 500 detects 506 a trigger event. If the method 500 determines 508 that there is not a loss of contact with the mobile communication device 114 of the passenger 112, the method 500 determines if the ride service vehicle 120 has arrived at the designated pickup location.

If the method 500 determines 510 that the battery charge status of the battery of the mobile communication device 114 of the passenger 112 is not above the battery threshold, the method 500 determines 512 that the ride service vehicle 120 has arrived at the designated pickup location and determines 514 if a location of the passenger 112 is at the designated pickup location. If the method 500 determines 514 that the passenger 112 is at the pickup location, the method 500 ends, which ends the method 400 of FIG. 4. If the method 500 determines 514 that the passenger 112 is not at the designated pickup location, the method starts 516 a pickup timer and determines 518 if the location of the passenger 112 is different than the designated pickup location by a threshold pickup distance.

If the method 500 determines that the location of the passenger 112 is different than the designated pickup location by a threshold pickup distance, the method 500 determines 520 if the pickup timer has expired. If the method 500 determines 520 that the pickup timer has not expired, the method 500 returns and continues to determine 518 if the location of the passenger 112 is different than the designated pickup location by a threshold pickup distance. If the method 500 determines 520 that the pickup timer has expired, the method 500 detects 506 a trigger event. If the method 500 determines 518 that the location of the passenger 112 is not different than the designated pickup location by a threshold pickup distance, the method 500 ends, which ends the method 400 of FIG. 4. Note that while the steps 502-520 of the method 500 are depicted in a sequence, parts of the method 500 may execute in parallel. In various embodiments, the method 500 is implemented using the passenger contact module 304, the battery status module 306, the passenger location module 310, the pickup timer module 312 and/or the vehicle location module 314.

Figure 6A:
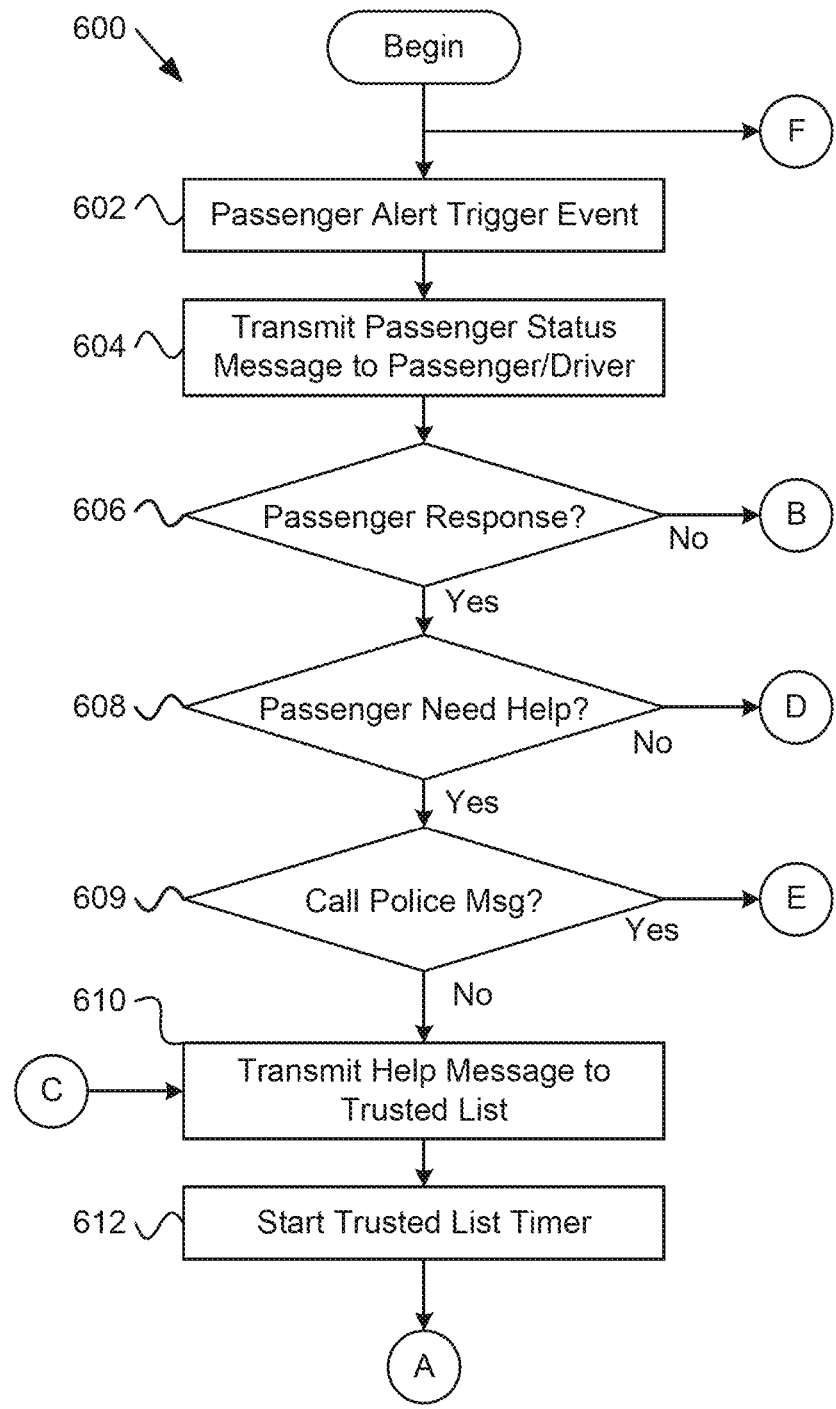
FIG. 6A is a schematic flow chart diagram illustrating a first part of another embodiment of a method for an automatic security check for a missing passenger of a ride service.
Figure 6B:
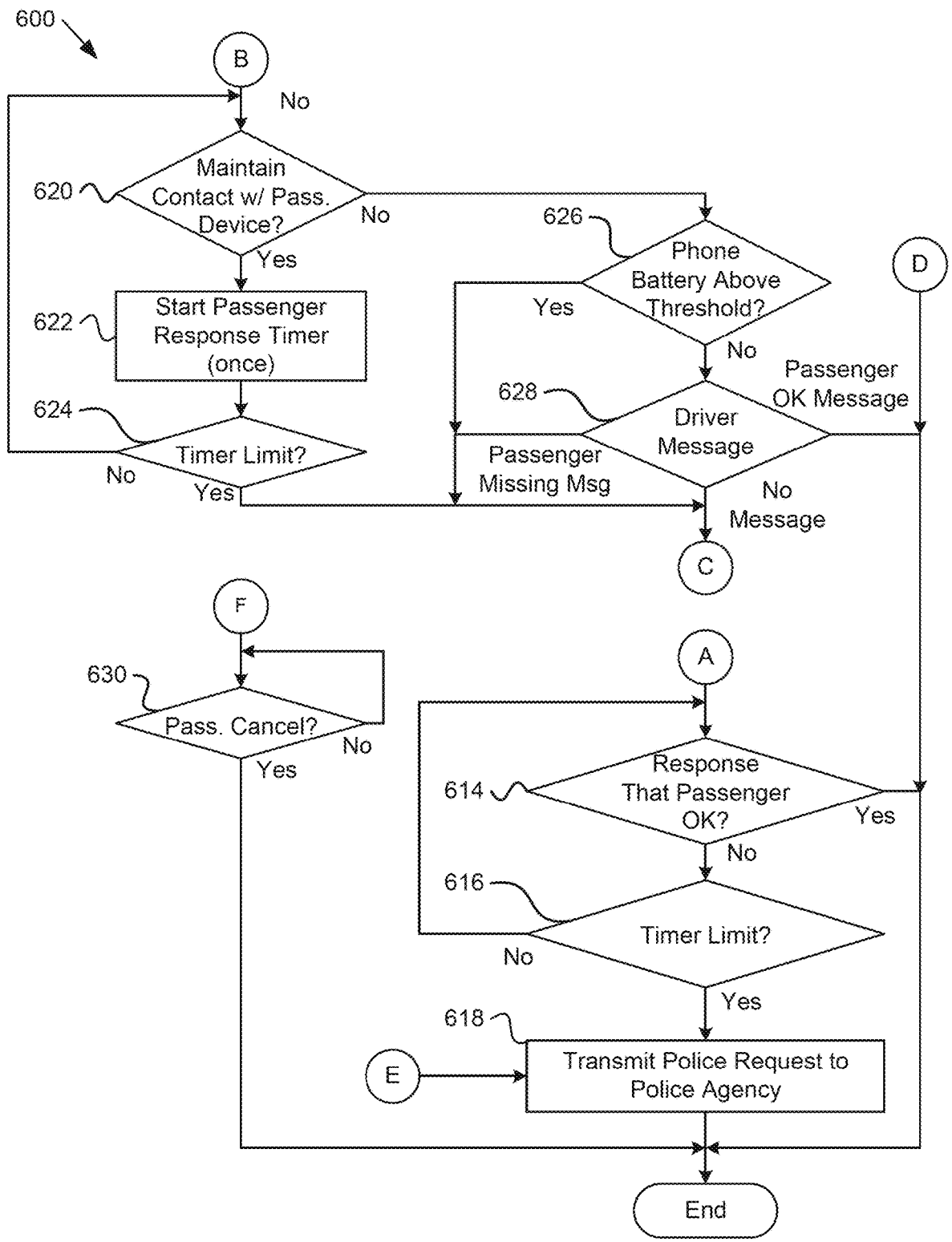
FIG. 6B is a schematic flow chart diagram illustrating a second part of the method of FIG. 6A.

FIG. 6A is a schematic flow chart diagram illustrating a first part of another embodiment of a method 600 for an automatic security check for a missing passenger 112 on a ride service and FIG. 6B is a schematic flow chart diagram illustrating a second part of the method of FIG. 6A. The method 600 begins and detects 602 a trigger event and transmits 604 a passenger status message in response to the method 600 detecting 602 the trigger event. The trigger event is indicative of a passenger 112 failing to be picked up at a designated pickup location by a ride service vehicle 120. The trigger event may be a trigger event from the method 500 of FIG. 5 or other trigger event. The passenger status message is transmitted to a mobile communication device 114 of the passenger 112 and to a driver 116 of the ride service vehicle 120.

The method 600 determines 606 if there is a response from the passenger 112 to the passenger status message. If the method 600 determines 606 that there is a response from the passenger 112 to the passenger status message, the method 600 determines 608 if the response from the passenger 112 is indicative of a request for help by the passenger 112. If the method 600 determines 608 that the response from the passenger 112 is indicative of a request for help by the passenger 112, the method 600 determines 609 if the response from the passenger 112 is a request for police assistance. If the method 600 determines 609 that the response from the passenger 112 is not a request for police assistance, the method 600 transmits 610 a help message to one or more members of a passenger trusted list, starts 612 a trusted list timer and determines 614 (follow A on FIG. 6A to A on FIG. 6B) if there is a response from a member of the trusted list that indicates that the passenger 112 does not need assistance.

If the method 600 determines 614 that there is not a response from a member of the trusted list that indicates that the passenger 112 does not need assistance, the method 600 determines 616 if the trusted list timer has reached a trusted list timeout. If the method 600 determines 616 that the trusted list timer has not reached a trusted list timeout, the method 600 returns and determines 614 if there is a response from a member of the trusted list that indicates that the passenger 112 does not need assistance. If the determines 616 that the trusted list timer has reached a trusted list timeout, the method 600 transmits 618 to a local police agency a police request to assist the passenger 112, and the method 600 ends. If the method 600 determines 614 that there is a response from a member of the trusted list that indicates that the passenger 112 does not need assistance, the method 600 ends.

If the method 600 determines 606 that there is not a response from the passenger 112 to the passenger status message, the method 600 determines 620 (follow B from FIG. 6A to B on FIG. 6B) if contact if maintained with the mobile communication device 114 of the passenger 112. If the method 600 determines 620 that contact is maintained with the mobile communication device 114 of the passenger 112, the method 600 starts 622 a passenger response timer (first time through the loop) and determines 624 if the passenger response timer has reached a passenger timeout. If the method 600 determines 624 that the passenger response timer has not reached a passenger timeout, the method 600 returns and determines 620 if contact if maintained with the mobile communication device 114 of the passenger 112, skips step 622 (second and subsequent times through the loop) and determines if the passenger response timer has reached the passenger timeout. If the method 600 determines 624 that the passenger response timer has reached a passenger timeout, the method 600 transmits 610 (follow C on FIG. 6B to C on FIG. 6A) a help message to one or more members of a passenger trusted list.

If the method 600 determines 620 determines 620 that contact is not maintained with the mobile communication device 114 of the passenger 112, the method 600 determines 626 if the battery charge status of the battery of the mobile communication device 114 of the passenger 112 is above a battery threshold. If the method 600 determines 625 that the battery charge status of the battery of the mobile communication device 114 of the passenger 112 is above a battery threshold, the method 600 transmits 610 (follow C on FIG. 6B to C on FIG. 6A) a help message to one or more members of a passenger trusted list. If the method 600 determines 626 that the battery charge status of the battery of the mobile communication device 114 of the passenger 112 is not above a battery threshold, the method 600 determines 628 if there is a response from the driver 116 to the passenger status message.

If the method 600 determines 628 that there is a response from the driver 116 to the passenger status message and the message is that the passenger 112 is missing, the method 600 transmits 610 (follow C on FIG. 6B to C on FIG. 6A) a help message to one or more members of a passenger trusted list. If the method 600 determines 628 that there is not a response from the driver 116 to the passenger status message, the method 600 transmits 610 (follow C on FIG. 6B to C on FIG. 6A) a help message to one or more members of a passenger trusted list. If the method 600 determines 628 that there is a response from the driver 116 to the passenger status message and the message is that the passenger 112 is okay, the method 600 ends.

If the method 600 determines 606 that there is a response from the passenger 112 to the passenger status message and the method 600 determines 608 that the response from the passenger 112 is that the passenger 112 does not require assistance, the method 600 ends (follow D on FIG. 6A to D on FIG. 6B). If the method 600 determines 606 that there is a response from the passenger 112 to the passenger status message and the method 600 determines 608 that the response from the passenger 112 is indicative of the passenger 112 needing assistance and determines 609 that the response from the passenger is a request for police help, the method 600 transmits 618 (follow E on FIG. 6A to E on FIG. 6B) to a local police agency a police request to assist the passenger 112, and the method 600 ends.

At any time after the method 600 begins, the method 600 independently determines 630 (follow F on FIG. 6A to F on FIG. 6B) if the passenger 112 has cancelled the request for a ride from the ride service. If the method 600 determines 630 that there is not a request to cancel the ride from the ride service, the method 600 returns and continues to determine 630 if the passenger 112 has cancelled the request for a ride from the ride service while the rest of the method 600 executes. If the method 600 determines 630 at any time that the passenger has cancelled the request for a ride from the ride service, the method 600 ends. In various embodiments, the method 600 is implemented using the passenger status module 202, the help message module 204, the trusted list module 206, the police help module 208, the passenger timeout module 302, the passenger contact module 304, the battery status module 306, the driver message module 308, the passenger location module 310, the pickup timer module 312, the vehicle location module 314 and/or the panic message module 316.

Figure 7:
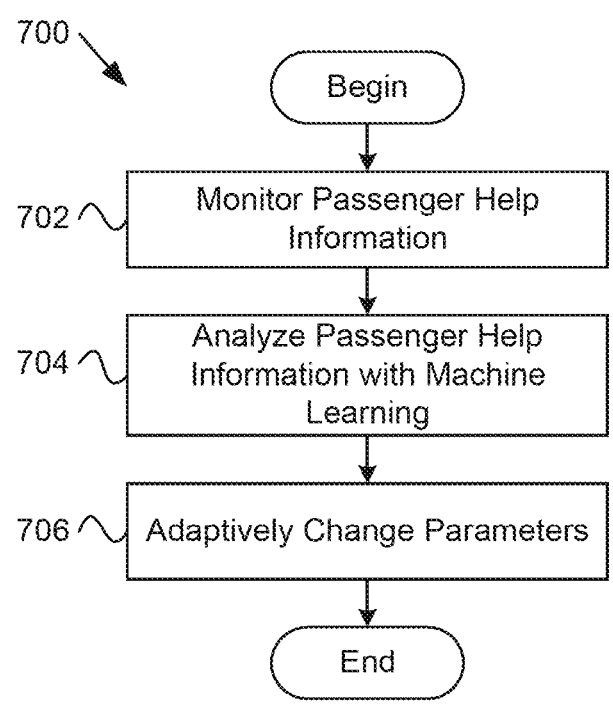
FIG. 7 is a schematic flow chart diagram illustrating one embodiment of a machine learning method for an automatic security check for a missing passenger of a ride service.

FIG. 7 is a schematic flow chart diagram illustrating one embodiment of a machine learning method 700 for an automatic security check for a missing passenger 112 of a ride service. The method 700 begins and monitors 702 passenger help information. The passenger help information includes information present within the passenger alert apparatus 102 that would be useful in adjusting parameters of the passenger alert apparatus 102. In some embodiments, the passenger help information includes trigger events, timeouts associated with trigger events, timing associated with receiving a reply from the passenger 112 to the passenger status message, vehicle arrival timing with respect to a scheduled pickup time, timing of receipt of a message from members of the passenger trusted list with respect to transmission of the help message and/or police response time regarding the police request.

The method 700 analyzes 704 the passenger help information and adaptively changes 706 parameters associated with the passenger alert apparatus 102 in response to machine learning based on the passenger help information, and the method 700 ends. For example, the method 700 may use machine learning to identify that a default passenger timeout is too long and may adjust the passenger timeout. For example, the method 700 may use machine learning to determine that the default passenger timeout is resulting in passenger problems that may be solved where sending the help message sooner would result in better passenger safety. In other embodiments, the method 700 may use machine learning to determine that the police help module 208 or the methods 400, 600 of FIGS. 4, 6A and 6B are sending too many police requests that are false alarms and that a longer trusted list timeout would result in less false alarms. The method 700 uses machine learning to analyze trends, patterns, etc. to adaptively change parameters associated with the passenger alert apparatus 102. In various embodiments, the method 700 is implemented using the help information module 318 and/or the machine learning module 320.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor; and
   a memory that stores program code executable by the processor to:
   transmit a passenger status message in response to a trigger event indicative of a passenger failing to be picked up at a designated pickup location by a vehicle of a ride service, the passenger status message transmitted to a mobile communication device of the passenger and to a driver of the vehicle;
   transmit a help message to at least one member of a passenger trusted list in response to receiving a reply to the passenger status message from the passenger indicative of a request for help by the passenger; and
   transmit to a local police agency a police request to assist the passenger in response to a trusted list timeout, the trusted list timeout indicative of not receiving a message from a member of the passenger trusted list that indicates the passenger does not need assistance within a trusted list timeout period.

2. The apparatus of claim 1, wherein the program code is further executable by the processor to transmit the help message to the at least one member of the passenger trusted list in response to a passenger timeout and maintaining contact with the mobile communication device of the passenger, the passenger timeout indicative of not receiving a response to the passenger status message from the passenger within a passenger timeout period.

3. The apparatus of claim 2, wherein the passenger timeout is shorter for a first passenger deemed more at risk than a second passenger.

4. The apparatus of claim 1, wherein the program code is further executable by the processor to transmit the help message to the at least one member of the passenger trusted list in response to losing contact with the mobile communication device of the passenger and a battery charge status of the mobile communication device of the passenger being at or above a battery threshold prior to the loss of contact with the mobile communication device of the passenger.

5. The apparatus of claim 1, wherein the program code is further executable by the processor to transmit the help message to the at least one member of the passenger trusted list in response to losing contact with the mobile communication device of the passenger, a battery charge status of the mobile communication device of the passenger being below a battery threshold prior to the loss of contact with the mobile communication device of the passenger and in response to receiving a passenger missing message from the driver in response to the passenger status message.

6. The apparatus of claim 1, wherein the program code is further executable by the processor to prevent sending of the help message to the at least one member of the passenger trusted list in response to:
   receiving a message from the passenger indicating that the passenger does not require assistance;
   receiving a message from the passenger indicating that the passenger has cancelled a request for a ride from the ride service; and/or
   losing contact with the mobile communication device of the passenger, a battery charge status of the mobile communication device of the passenger being below a battery threshold prior to the loss of contact with the mobile communication device of the passenger and in response to receiving a passenger okay message from the driver in response to the passenger status message.

7. The apparatus of claim 1, wherein the trigger event comprises the vehicle arriving at the designated pickup location and, after expiration of a pickup time limit, a location of the mobile communication device of the passenger being different than the designated pickup location by a threshold pickup distance.

8. The apparatus of claim 1, wherein the trigger event comprises, while the vehicle is traveling toward the designated pickup location, a location of the mobile communication device is moving away from the designated pickup location.

9. The apparatus of claim 1, wherein the trigger event comprises, while the vehicle is traveling toward the designated pickup location, losing contact with the mobile communication device of the passenger and a battery charge status of the mobile communication device of the passenger being at or above a battery threshold prior to the loss of contact with the mobile communication device of the passenger.

10. The apparatus of claim 1, wherein the help message and/or the police request comprise:
    a last known location of the mobile communication device of the passenger;
    the designated pickup location;
    a scheduled pickup time;
    identification information regarding the passenger;
    contact information of the passenger;
    identification information regarding the driver;
    contact information of the driver;
    the passenger trusted list and associated contact information;
    identifying information of the vehicle of the ride service; and/or
    contact information of the ride service.

11. The apparatus of claim 1, wherein the trusted list timeout and/or a timeout associated with the trigger event is shorter for a first passenger deemed more at risk than a second passenger.

12. The apparatus of claim 1, wherein the program code is further executable by the processor to:
    monitor passenger help information comprising trigger events, timeouts associated with trigger events, timing associated with receiving a reply from the passenger to the passenger status message, vehicle arrival timing with respect to a scheduled pickup time, timing of receipt of a message from members of the passenger trusted list with respect to transmission of the help message and/or police response time regarding the police request; and
    adaptively change parameters associated with the apparatus in response to machine learning based on the passenger help information.

13. A method comprising:
    transmitting, by use of a processor, a passenger status message in response to a trigger event indicative of a passenger failing to be picked up at a designated pickup location by a vehicle of a ride service, the passenger status message transmitted to a mobile communication device of the passenger and to a driver of the vehicle;

transmitting, by use of a processor, a help message to at least one member of a passenger trusted list in response to receiving a reply to the passenger status message from the passenger indicative of a request for help by the passenger; and transmitting, by use of a processor, to a local police agency a police request to assist the passenger in response to a trusted list timeout, the trusted list timeout indicative of not receiving a message from a member of the passenger trusted list that indicates the passenger does not need assistance within a trusted list timeout period.

14. The method of claim 13, further comprising transmitting the help message to the at least one member of the passenger trusted list in response to a passenger timeout and maintaining contact with the mobile communication device of the passenger, the passenger timeout indicative of not receiving a response to the passenger status message from the passenger within a passenger timeout period.

15. The method of claim 13, further comprising:
transmitting, by use of a processor, the help message to the at least one member of the passenger trusted list in response to losing contact with the mobile communication device of the passenger and a battery charge status of the mobile communication device of the passenger being at or above a battery threshold prior to the loss of contact with the mobile communication device of the passenger; and/or transmitting, by use of a processor, the help message to the at least one member of the passenger trusted list in response to losing contact with the mobile communication device of the passenger, a battery charge status of the mobile communication device of the passenger being below a battery threshold prior to the loss of contact with the mobile communication device of the passenger and in response to receiving a passenger missing message from the driver in response to the passenger status message.

16. The method of claim 13, further comprising preventing sending of the help message to the at least one member of the passenger trusted list in response to:
receiving a message from the passenger indicating that the passenger does not require assistance;
receiving a message from the passenger indicating that the passenger has cancelled a request for a ride from the ride service; and/or
losing contact with the mobile communication device of the passenger, a battery charge status of the mobile communication device of the passenger being below a battery threshold prior to the loss of contact with the mobile communication device of the passenger and in response to receiving a passenger okay message from the driver in response to the passenger status message.

17. The method of claim 13, wherein the trigger event comprises:
the vehicle arriving at the designated pickup location and, after expiration of a pickup time limit, a location of the mobile communication device of the passenger being different than the designated pickup location by a threshold pickup distance;

while the vehicle is traveling toward the designated pickup location, a location of the mobile communication device is moving away from the designated pickup location; and/or while the vehicle is traveling toward the designated pickup location, losing contact with the mobile communication device of the passenger and a battery charge status of the mobile communication device of the passenger being at or above a battery threshold prior to the loss of contact with the mobile communication device of the passenger.

18. The method of claim 13, further comprising:
monitoring passenger help information comprising trigger events, timeouts associated with trigger events, timing associated with receiving a reply from the passenger to the passenger status message, vehicle arrival timing with respect to a scheduled pickup time, timing of receipt of a message from members of the passenger trusted list with respect to transmission of the help message and/or police response time regarding the police request; and adaptively changing parameters associated with the method in response to machine learning based on the passenger help information.

19. A program product comprising a computer readable storage medium and program code, the program code being configured to be executable by a processor to perform operations comprising:
transmitting a passenger status message in response to a trigger event indicative of a passenger failing to be picked up at a designated pickup location by a vehicle of a ride service, the passenger status message transmitted to a mobile communication device of the passenger and to a driver of the vehicle;
transmitting a help message to at least one member of a passenger trusted list in response to receiving a reply to the passenger status message from the passenger indicative of a request for help by the passenger; and
transmitting to a local police agency a police request to assist the passenger in response to a trusted list timeout, the trusted list timeout indicative of not receiving a message from a member of the passenger trusted list that indicates the passenger does not need assistance within a trusted list timeout period.

20. The program product of claim 19, further comprising program code to perform operations comprising:
transmitting the help message to the at least one member of the passenger trusted list in response to a passenger timeout and maintaining contact with the mobile communication device of the passenger, the passenger timeout indicative of not receiving a response to the passenger status message from the passenger within a passenger timeout period;
transmitting the help message to the at least one member of the passenger trusted list in response to losing contact with the mobile communication device of the passenger and a battery charge status of the mobile communication device of the passenger being at or above a battery threshold prior to the loss of contact with the mobile communication device of the passenger; and/or
transmitting the help message to the at least one member of the passenger trusted list in response to losing contact with the mobile communication device of the passenger, a battery charge status of the mobile communication device of the passenger being below a battery threshold prior to the loss of contact with the mobile communication device of the passenger and in response to receiving a passenger missing message from the driver in response to the passenger status message; and wherein the trigger event comprises:
the vehicle arriving at the designated pickup location and, after expiration of a pickup time limit, a location of the mobile communication device of the passenger being different than the designated pickup location by a threshold pickup distance;

while the vehicle is traveling toward the designated pickup location, a location of the mobile communication device is moving away from the designated pickup location; and/or while the vehicle is traveling toward the designated pickup location, losing contact with the mobile communication device of the passenger and a battery charge status of the mobile communication device of the passenger being at or above a battery threshold prior to the loss of contact with the mobile communication device of the passenger.

\* \* \* \* \*